(12) United States Patent
Abe et al.

(10) Patent No.: US 11,762,520 B2
(45) Date of Patent: Sep. 19, 2023

(54) ELECTROSTATIC CAPACITANCE SENSOR AND INPUT DEVICE

(71) Applicant: Alps Alpine Co., Ltd., Tokyo (JP)

(72) Inventors: Keishi Abe, Miyagi-ken (JP); Shunsuke Umemura, Miyagi-ken (JP); Yasuhiko Hiratate, Miyagi-ken (JP)

(73) Assignee: Alps Alpine Co., Ltd.

( * ) Notice: Subject to any disclaimer, the term of this patent is extended or adjusted under 35 U.S.C. 154(b) by 0 days.

(21) Appl. No.: 17/669,428

(22) Filed: Feb. 11, 2022

(65) Prior Publication Data

US 2022/0164068 A1 May 26, 2022

Related U.S. Application Data

(63) Continuation of application No. PCT/JP2020/011611, filed on Mar. 17, 2020.

(30) Foreign Application Priority Data

Sep. 18, 2019 (JP) ................................. 2019-169683

(51) Int. Cl.
*G06F 3/044* (2006.01)
*G06F 3/041* (2006.01)

(52) U.S. Cl.
CPC .......... *G06F 3/0446* (2019.05); *G06F 3/0416* (2013.01); *G06F 3/0443* (2019.05);
(Continued)

(58) Field of Classification Search
CPC .... G06F 3/0446; G06F 3/0416; G06F 3/0443; G06F 2203/04108; G06F 2203/04111; G06F 2203/04166
See application file for complete search history.

(56) References Cited

U.S. PATENT DOCUMENTS 8,550,991 B2 10/2013 Nam
8,730,203 B2 5/2014 Olivier
(Continued)

FOREIGN PATENT DOCUMENTS

CN 102163111 A 8/2011
CN 102362245 A 2/2012
(Continued)

OTHER PUBLICATIONS

International Search Report (English translation) for corresponding International Application No. PCT/JP2020/011611 dated Jun. 16, 2020 (4 Pages).

*Primary Examiner* — Darlene M Ritchie
(74) *Attorney, Agent, or Firm* — Harness, Dickey & Pierce, P.L.C.

(57) ABSTRACT

An electrostatic capacitance sensor includes first detection electrodes and second detection electrodes that are disposed orthogonal to each other. Each of the first detection electrodes and the second detection electrodes has detection faces that are linearly arranged and connection portions that connect the two adjacent detection faces. The electrostatic capacitance sensor has intersections of the first detection electrodes and the second detection electrodes, the intersections being arranged in a matrix. The intersections where resistors are provided at the connection portions of the first detection electrodes and the intersections where resistors are provided at the connection portions of the second detection electrodes are alternately arranged.

7 Claims, 8 Drawing Sheets

(52) U.S. Cl.
CPC .............. *G06F 2203/04108* (2013.01); *G06F 2203/04111* (2013.01)

(56) References Cited

U.S. PATENT DOCUMENTS

| | | | |
|---|---|---|---|
| 8,766,935 B2 | 7/2014 | Matsuo | |
| 9,588,623 B2* | 3/2017 | Chang | G06F 3/0412 |
| 9,829,523 B1 | 11/2017 | Peterson et al. | |
| 10,684,735 B2 | 6/2020 | Sasaki et al. | |
| 10,969,915 B2 | 4/2021 | Yamai et al. | |
| 11,112,920 B2 | 9/2021 | Yamada et al. | |
| 2010/0182255 A1 | 7/2010 | Jeong et al. | |
| 2012/0092294 A1 | 4/2012 | Ganapathi et al. | |
| 2014/0292676 A1 | 10/2014 | Hayashi et al. | |
| 2015/0029423 A1* | 1/2015 | Huang | G06F 3/0443 |
| | | | 349/12 |
| 2015/0193050 A1* | 7/2015 | Chai | G06F 3/0445 |
| | | | 345/174 |
| 2016/0299631 A1* | 10/2016 | Lee | G06F 3/0446 |
| 2023/0016679 A1* | 1/2023 | Na | H10K 59/40 |

FOREIGN PATENT DOCUMENTS

| | | |
|---|---|---|
| CN | 103168283 A | 6/2013 |
| CN | 104238849 A | 12/2014 |
| CN | 102096532 B | 7/2015 |
| CN | 109791458 A | 5/2019 |
| CN | 110023892 A | 7/2019 |
| JP | H06-317813 A | 11/1994 |
| JP | 2010-231533 A | 10/2010 |
| JP | 2014-504769 A | 2/2014 |
| JP | 2014-199492 A | 10/2014 |
| WO | 2018-012030 A1 | 1/2018 |

\* cited by examiner

|     | $C_1$ | $C_2$ | $C_3$ | $C_4$ | $C_5$ |
| --- | --- | --- | --- | --- | --- |
| $Y_a$ | 0.5 | 0.5 | 0.5 | 0.5 | 0.5 |
| $Y_b$ | 0.5 | 0.5 | 0.5 | 0.5 | 0.5 |
| $Y_c$ | 0.5 | 0.5 | 0.5 | 0.5 | 0.5 |
| $Y_d$ | 0.5 | 0.5 | 0.5 | 0.5 | 0.5 |

×

511

|     | $C_1$ | $C_2$ | $C_3$ | $C_4$ | $C_5$ |
| --- | --- | --- | --- | --- | --- |
| $Y_a$ | 1 | 1 | 0.5 | 0.5 | 0 |
| $Y_b$ | 1 | 0.5 | 0.5 | 0 | 0 |
| $Y_c$ | 1 | 1 | 0.5 | 0.5 | 0 |
| $Y_d$ | 1 | 0.5 | 0.5 | 0 | 0 |

=

521

|     | $C_1$ | $C_2$ | $C_3$ | $C_4$ | $C_5$ |
| --- | --- | --- | --- | --- | --- |
| $Y_a$ | 0.5 | 0.5 | 0.25 | 0.25 | 0 |
| $Y_b$ | 0.5 | 0.25 | 0.25 | 0 | 0 |
| $Y_c$ | 0.5 | 0.5 | 0.25 | 0.25 | 0 |
| $Y_d$ | 0.5 | 0.25 | 0.25 | 0 | 0 |

FIG. 7

|    | $C_1$ | $C_2$ | $C_3$ | $C_4$ | $C_5$ |
|----|-----|-----|-----|-----|-----|
| Ya | 0.5 | 0.5 | 0.5 | 0.5 | 0.5 |
| Yb | 0.5 | 0.5 | 0.5 | 0.5 | 0.5 |
| Yc | 0.5 | 0.5 | 0.5 | 0.5 | 0.5 |
| Yd | 0.5 | 0.5 | 0.5 | 0.5 | 0.5 |

×

|    | $C_1$ | $C_2$ | $C_3$ | $C_4$ | $C_5$ |
|----|---|-----|-----|-----|---|
| Ya | 0 | 0.5 | 0.5 | 1   | 1 |
| Yb | 0 | 0   | 0.5 | 0.5 | 1 |
| Yc | 0 | 0.5 | 0.5 | 1   | 1 |
| Yd | 0 | 0   | 0.5 | 0.5 | 1 |

=

|    | $C_1$ | $C_2$ | $C_3$ | $C_4$ | $C_5$ |
|----|---|------|------|------|-----|
| Ya | 0 | 0.25 | 0.25 | 0.5  | 0.5 |
| Yb | 0 | 0    | 0.25 | 0.25 | 0.5 |
| Yc | 0 | 0.25 | 0.25 | 0.5  | 0.5 |
| Yd | 0 | 0    | 0.25 | 0.25 | 0.5 |

FIG. 8

|  | Xa | Xb | Xc | Xd | Xe |
|---|---|---|---|---|---|
| $C_1$ | 0.5 | 0.5 | 0.5 | 0.5 | 0.5 |
| $C_2$ | 0.5 | 0.5 | 0.5 | 0.5 | 0.5 |
| $C_3$ | 0.5 | 0.5 | 0.5 | 0.5 | 0.5 |
| $C_4$ | 0.5 | 0.5 | 0.5 | 0.5 | 0.5 |

×

|  | Xa | Xb | Xc | Xd | Xe |
|---|---|---|---|---|---|
| $C_1$ | 1 | 0.75 | 1 | 0.75 | 1 |
| $C_2$ | 0.5 | 0.75 | 0.5 | 0.75 | 0.5 |
| $C_3$ | 0.5 | 0.25 | 0.5 | 0.25 | 0.5 |
| $C_4$ | 0 | 0.25 | 0 | 0.25 | 0 |

=

|  | Xa | Xb | Xc | Xd | Xe |
|---|---|---|---|---|---|
| $C_1$ | 0.5 | 0.375 | 0.5 | 0.375 | 0.5 |
| $C_2$ | 0.25 | 0.375 | 0.25 | 0.375 | 0.25 |
| $C_3$ | 0.25 | 0.125 | 0.25 | 0.125 | 0.25 |
| $C_4$ | 0 | 0.125 | 0 | 0.125 | 0 |

FIG. 9

|   | Xa | Xb | Xc | Xd | Xe |
|---|---|---|---|---|---|
| $C_1$ | 0.5 | 0.5 | 0.5 | 0.5 | 0.5 |
| $C_2$ | 0.5 | 0.5 | 0.5 | 0.5 | 0.5 |
| $C_3$ | 0.5 | 0.5 | 0.5 | 0.5 | 0.5 |
| $C_4$ | 0.5 | 0.5 | 0.5 | 0.5 | 0.5 |

502

×

|   | Xa | Xb | Xc | Xd | Xe |
|---|---|---|---|---|---|
| $C_1$ | 0.25 | 0 | 0.25 | 0 | 0.25 |
| $C_2$ | 0.25 | 0.5 | 0.25 | 0.5 | 0.25 |
| $C_3$ | 0.75 | 0.5 | 0.75 | 0.5 | 0.75 |
| $C_4$ | 0.75 | 1 | 0.75 | 1 | 0.75 |

514

=

|   | Xa | Xb | Xc | Xd | Xe |
|---|---|---|---|---|---|
| $C_1$ | 0.125 | 0 | 0.125 | 0 | 0.125 |
| $C_2$ | 0.125 | 0.25 | 0.125 | 0.25 | 0.125 |
| $C_3$ | 0.375 | 0.25 | 0.375 | 0.25 | 0.375 |
| $C_4$ | 0.375 | 0.5 | 0.375 | 0.5 | 0.375 |

524

ELECTROSTATIC CAPACITANCE SENSOR AND INPUT DEVICE

CLAIM OF PRIORITY

This application is a Continuation of International Application No. PCT/JP2020/011611 filed on Mar. 17, 2020, which claims benefit of Japanese Patent Application No. 2019-169683 filed on Sep. 18, 2019. The entire contents of each application noted above are hereby incorporated by reference.

BACKGROUND OF THE INVENTION

1. Field of the Invention

The present invention relates to an electrostatic capacitance sensor and an input device.

2. Description of the Related Art

Heretofore, a technology has been known in which an electrostatic capacitance sensor including a plurality of vertical electrodes and a plurality of horizontal electrodes that are orthogonal to each other detects a proximity state of an operating body relative to an operation surface of an input device to generate image data indicating the proximity state.

For example, International Publication No. 2018/012030 discloses a technology for an electrostatic capacitance sensor including vertical electrodes and horizontal electrodes that are orthogonal to each other. In the technology, a proximity position of an operating body at each electrode is detected based on a ratio of a current value detected at a detecting portion at one end side of the electrode to a current value detected at a detecting portion at another end side of the electrode.

Meanwhile, in the electrostatic capacitance sensor of the related art detection electrodes in which detection faces are linearly arranged and the adjacent two detection faces are connected at a connection portion are utilized for the vertical electrodes and the horizontal electrodes. In such an electrostatic capacitance sensor, although the detection faces of the vertical electrodes and the detection faces of the horizontal electrode are arranged so as not to overlap each other in plan view, it is necessary that the connection portions of the vertical electrodes and the connection portions of the horizontal electrodes intersect each other. Also, in such an electrostatic capacitance sensor, in order to detect the proximity position of an operating body on the detection electrodes, as described above, there are cases in which resistors are provided at the connection portions of the vertical electrodes and the connection portions of the horizontal electrodes at the intersections where the vertical electrodes and the horizontal electrodes intersect each other.

However, in the electrostatic capacitance sensor of the related art, since the resistors provided at the connection portions of the vertical electrodes and the resistors provided at the connection portions of the horizontal electrodes overlap each other at the intersections, the vertical electrodes and the horizontal electrodes need to be provided in layers different from each other in order to provide insulation between the resistors. Hence, it is difficult to reduce the thickness of the entire electrostatic capacitance sensor. Also, when the resistors are provided at the respective connection portions of the vertical electrodes and the respective connection portions of the horizontal electrodes at the intersections where the vertical electrodes and the horizontal electrodes intersect each other, there are problems in that the cost increases due to an increase in the amount of material used for forming the resistors, and also the number of fabrication processes increases.

SUMMARY OF THE INVENTION

An electrostatic capacitance sensor according to one embodiment includes first detection electrodes and second detection electrodes that are disposed orthogonal to each other. Each of the first detection electrodes and the second detection electrodes has detection faces that are linearly arranged and connection portions that connect the two adjacent detection faces. The electrostatic capacitance sensor has intersections of the first detection electrodes and the second detection electrodes, the intersections being arranged in a matrix. The intersections where resistors are provided at the connection portions of the first detection electrodes and the intersections where resistors are provided at the connection portions of the second detection electrodes are alternately arranged.

According to one embodiment, the resistors are provided at the respective detection electrodes to thereby make it possible to realize, in an electrostatic capacitance sensor that can detect a proximity position at detection electrodes, a reduction in the thickness of the entire electrostatic capacitance sensor.

BRIEF DESCRIPTION OF THE DRAWINGS

FIG. 6 illustrates an example of determination of a left coefficient table, the determination being made by a coefficient-table determining unit according to one embodiment;

FIG. 7 illustrates an example of determination of a right coefficient table, the determination being made by the coefficient-table determining unit according to one embodiment;

FIG. 8 illustrates an example of determination of an upper coefficient table, the determination being made by the coefficient-table determining unit according to one embodiment; and FIG. 9 illustrates an example of determination of a lower coefficient table, the determination being made by the coefficient-table determining unit according to one embodiment.

DESCRIPTION OF THE PREFERRED EMBODIMENTS

One embodiment will be described below with reference to the accompanying drawings.

(Configuration of Electrostatic Capacitance Sensor 100)

Figure 1A:
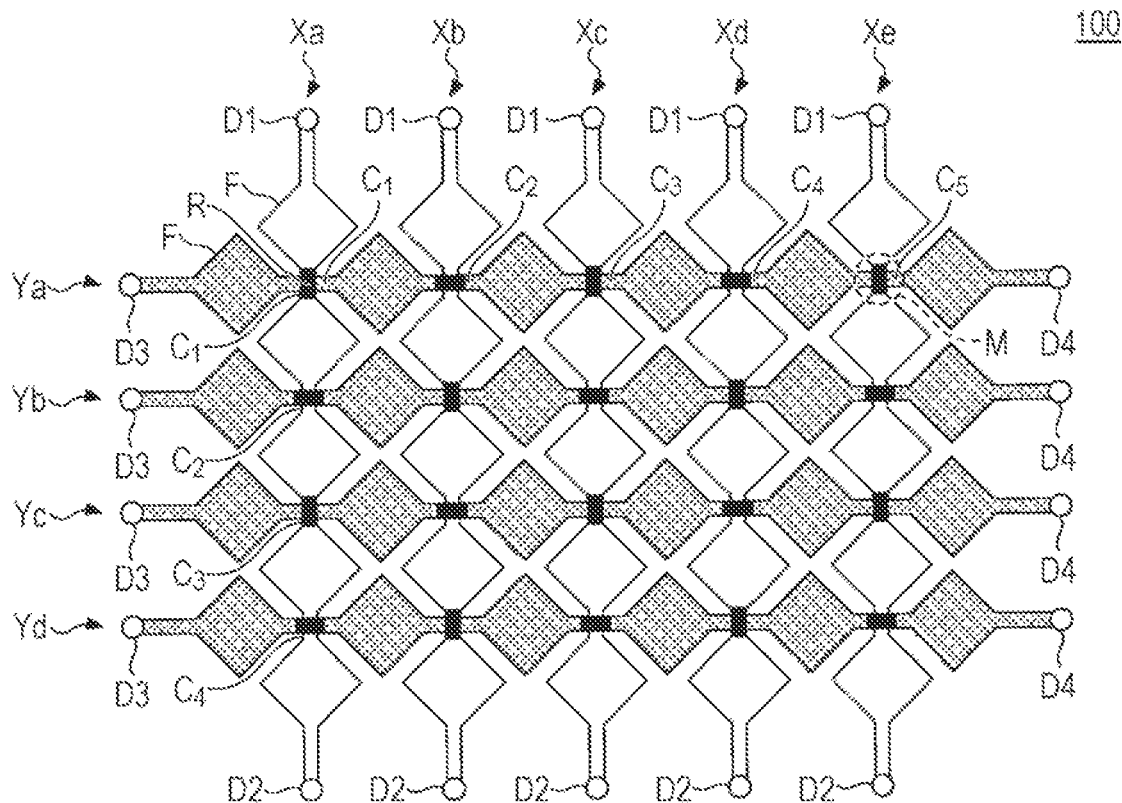
FIGS. 1A and 1B are views illustrating a configuration of an electrostatic capacitance sensor according to one embodiment.
Figure 1B:
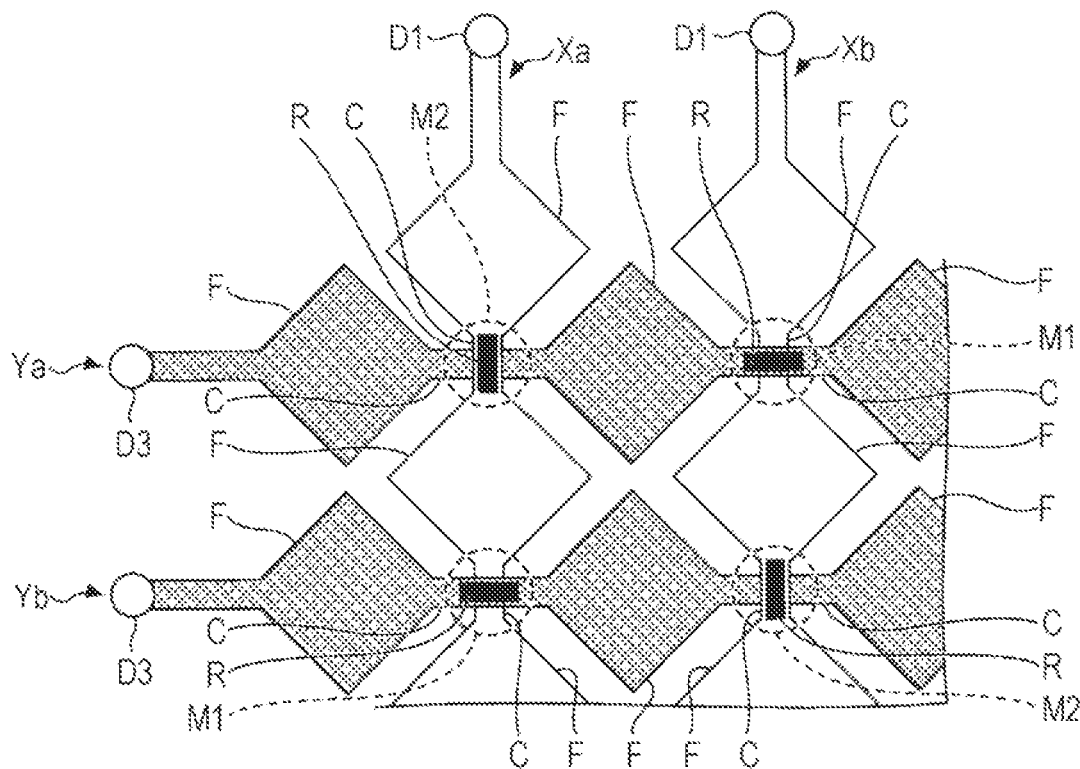

FIGS. 1A and 1B are views illustrating a configuration of an electrostatic capacitance sensor 100 according to one embodiment. FIG. 1A illustrates the entire electrostatic capacitance sensor 100. FIG. 1B is an enlarged partial view of the electrostatic capacitance sensor 100.

As illustrated in FIG. 1A, the electrostatic capacitance sensor 100 includes a plurality (five in the example illustrated in FIG. 1A) of first detection electrodes Xa to Xe and a plurality (four in the example illustrated in FIG. 1A) of second detection electrodes Ya to Yd that are disposed orthogonal to each other.

The first detection electrodes Xa to Xe extend in vertical directions. The first detection electrodes Xa to Xe are arranged parallel to each other in horizontal directions, with a certain gap therebetween. Each of the first detection electrodes Xa to Xe has a plurality (five in the example illustrated in FIG. 1A) of rhomboidal detection faces F linearly arranged in the vertical directions and has a shape in which the adjacent detection faces F are connected to each other via strip-shaped connection portions C (in the example illustrated in FIG. 1A, four connection portions $C_1$ to $C_4$ that are disposed from a detecting portion D1 to a detecting portion D2). That is, in the example illustrated in FIG. 1A, in the electrostatic capacitance sensor 100, the five first detection electrodes Xa to Xe have 25 detection faces F arranged in a matrix with five rows×five columns. The first detection electrodes Xa to Xe have, at an upper end portion, the detecting portions D1 for detecting electrostatic capacitance values of the respective first detection electrodes Xa to Xe and have, at a lower end portion, the detecting portions D2 for detecting electrostatic capacitance values of the first detection electrodes Xa to Xe. The first detection electrodes Xa to Xe are each formed using a metal film (e.g., a copper film), indium tin oxide (ITO), or other material having an electrical conductivity property.

The second detection electrodes Ya to Yd extend in the horizontal directions. The second detection electrodes Ya to Yd are arranged parallel to each other in vertical directions, with a certain gap therebetween. Each of the second detection electrodes Ya to Yd has a plurality (six in the example illustrated in FIG. 1A) of rhomboidal detection faces F linearly arranged in the horizontal directions and has a shape in which the adjacent detection faces F are connected to each other via strip-shaped connection portions C (in the example illustrated in FIG. 1A, five connection portions $C_1$ to $C_5$ that are disposed from a detecting portion D3 to a detecting portion D4). That is, in the example illustrated in FIG. 1A, in the electrostatic capacitance sensor 100, the four second detection electrodes Ya to Yd have 24 detection faces F arranged in a matrix with four rows×six columns. The second detection electrodes Ya to Yd have, at a left end portion, the detecting portions D3 for detecting electrostatic capacitance values of the second detection electrodes Ya to Yd and have, at a right end portion, the detecting portions D4 for detecting electrostatic capacitance values of the second detection electrodes Ya to Yd. The second detection electrodes Ya to Yd are each formed using a metal film (e.g., a copper film), ITO, or other material having an electrical conductivity property. Also, the detection faces F of the first detection electrodes Xa to Xe and the detection faces F of the second detection electrodes Ya to Yd are arranged so as not to overlap each other.

As illustrated in FIG. 1A, the electrostatic capacitance sensor 100 has intersections M of the first detection electrodes Xa to Xe and the second detection electrodes Ya to Yd, the intersections being arranged in a matrix. In the example illustrated in FIG. 1A, in the electrostatic capacitance sensor 100, the first detection electrodes Xa to Xe and the second detection electrodes Ya to Yd have 20 intersections M arranged in a matrix with four rows×five columns.

The intersections M are portions where the connection portions C of the first detection electrodes Xa to Xe and the connection portions C of the second detection electrodes Ya to Yd intersect each other.

In this case, in the electrostatic capacitance sensor 100, intersections M where resistors R are provided at the connection portions C of the first detection electrodes Xa to Xe and resistors R are not provided at the connection portions C of the second detection electrodes Ya to Yd and intersections M where resistors R are provided at the connection portions C of the second detection electrodes Ya to Yd and resistors R are not provided at the connection portions C of the first detection electrodes Xa to Xe are alternately arranged, as illustrated in FIG. 1A. That is, at each intersection M, the resistor R is provided at only one of the connection portions C of the first detection electrodes Xa to Xe and the connection portions C of the second detection electrodes Ya to Yd.

Specifically, the connection portions C at which the resistors R are provided and the connection portions C at which the resistors R are not provided are alternately arranged at the first detection electrodes Xa to Xe and the second detection electrodes Ya to Yd.

In addition, in the electrostatic capacitance sensor 100, at a certain intersection M (referred to as a "first intersection M1"), the connection portion C at which the resistor R is not provided at the first detection electrodes Xa to Xe and the connection portion C at which the resistor R is provided at the second detection electrodes Ya to Yd intersect each other.

Also, in the electrostatic capacitance sensor 100, at the intersection M (referred to as a "second intersection M2") that is adjacent to the first intersection M1, the connection portion C at which the resistor R is provided at the second detection electrodes Ya to Yd and the connection portion C at which the resistor R is not provided at the first detection electrodes Xa to Xe intersect each other.

Thus, the electrostatic capacitance sensor 100 is a sensor in which the second intersections M2 where the resistors R are provided at the connection portions C of the first detection electrodes Xa to Xe and the resistors R are not provided at the connection portions C of the second detection electrodes Ya to Yd and the first intersections M1 where the resistors R are provided at the connection portions C of the second detection electrodes Ya to Yd and the resistors R are not provided at the connection portions C of the first detection electrodes Xa to Xe are alternately arranged.

Figure 2:
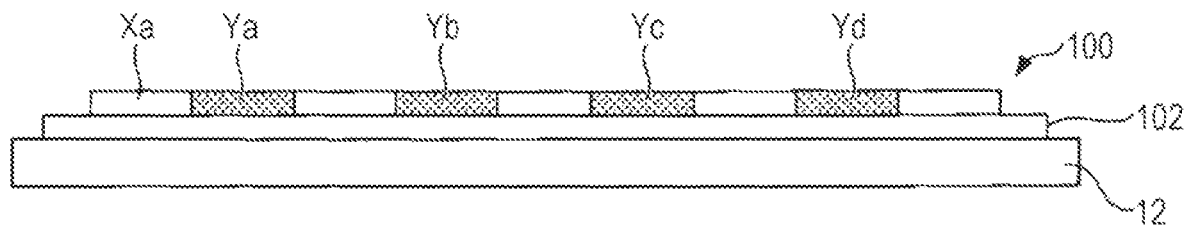
FIG. 2 is a side view of the electrostatic capacitance sensor according to one embodiment.

FIG. 2 is a side view of the electrostatic capacitance sensor 100 according to one embodiment. FIG. 2 illustrates a side surface of the electrostatic capacitance sensor 100, viewed from the left side. Also, FIG. 2 illustrates the electrostatic capacitance sensor 100 installed on a surface of an installation-target object 12 (e.g., a component).

As illustrated in FIG. 2, in the electrostatic capacitance sensor 100 in the present embodiment, the first detection electrodes Xa to Xe and the second detection electrodes Ya to Yd illustrated in FIG. 1A are mounted on a substrate 102. Also, as described with reference to FIG. 1A, the electrostatic capacitance sensor 100 in the present embodiment employs a configuration in which at each intersection M, the resistor R is provided at only one of the connection portions C of the first detection electrodes Xa to Xe and the connection portions C of the second detection electrodes Ya to Yd.

That is, in the electrostatic capacitance sensor 100 in the present embodiment, at each of the intersections M, the two resistors R, one of which is provided at one of the connection portions C of the first detection electrodes Xa to Xe and the other of which is provided at one of the connection portions C of the second detection electrodes Ya to Yd, do not overlap each other. Thus, in the electrostatic capacitance sensor 100 in the present embodiment, the first detection electrodes Xa to Xe and the second detection electrodes Ya to Yd do not need to be spaced from each other in up-and-down directions and hence can be provided in the same plane, as illustrated in FIG. 2.

Thus, according to the present embodiment, it is possible to reduce the thickness of the entire electrostatic capacitance sensor 100. Also, in the electrostatic capacitance sensor 100 in the present embodiment, since the first detection electrodes Xa to Xe and the second detection electrodes Ya to Yd are provided in the same plane, the detection sensitivity of the first detection electrodes Xa to Xe and the detection sensitivity of the second detection electrodes Ya to Yd can be made to be approximately the same.

A significantly thin resist is applied to portions between the connection portions C of the first detection electrodes Xa to Xe and the connection portions C of the second detection electrodes Ya to Yd, the connection portions D and the connection portions D intersecting each other, to thereby form insulation portions so that both the connection portions C and the connection portions C do not become electrically continuous. Alternatively, the connection portions C at which the resistors R are not provided may be connected via through-holes so that both the connection portions C of the first detection electrodes Xa to Xe and the connection portions C of the second detection electrodes Ya to Yd do not become electrically continuous with each other.

(Device Configuration of Input Device 10)

Figure 3:
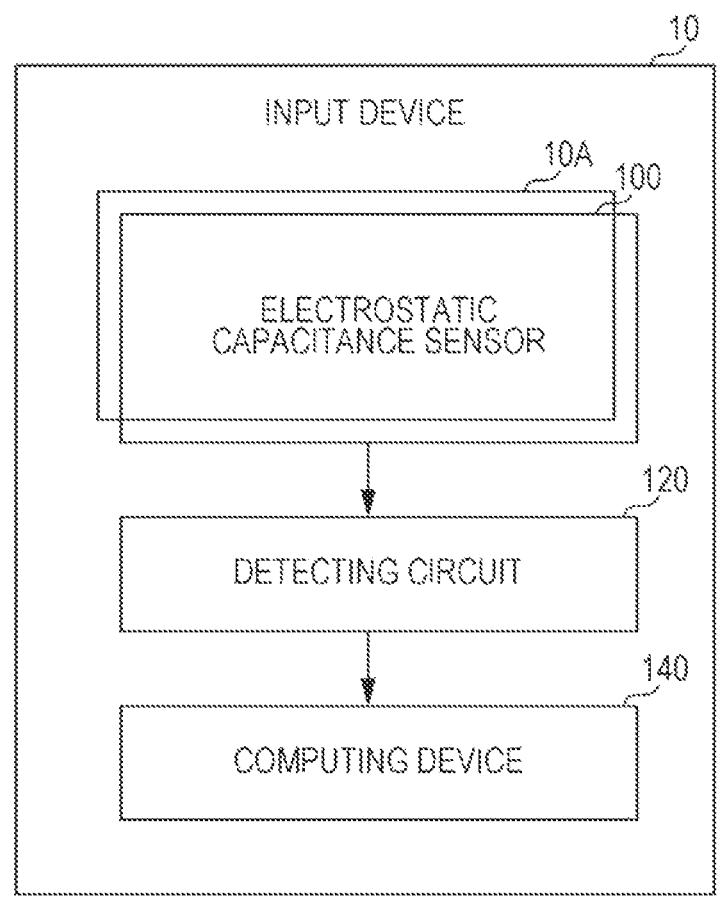
FIG. 3 is a block diagram illustrating a device configuration of an input device according to one embodiment.

FIG. 3 is a block diagram illustrating a device configuration of an input device 10 according to one embodiment. The input device 10 illustrated in FIG. 3 is a device that can detect a proximity state (a position, a range, and a distance) of an operating body relative to an operation surface 10A and can generate and output image data indicating the detected proximity state.

As illustrated in FIG. 3, the input device 10 includes the electrostatic capacitance sensor 100 (see FIG. 1A), a detecting circuit 120, and a computing device 140.

The electrostatic capacitance sensor 100 is provided superimposed on an operation surface 10A. In the electrostatic capacitance sensor 100, the electrostatic capacitance values of the first detection electrodes Xa to Xe and the second detection electrodes Ya to Yd change according to the proximity state of the operating body relative to the operation surface 10A.

With respect to each of the first detection electrodes Xa to Xe, the detecting circuit 120 detects the electrostatic capacitance value of the detecting portion D1 at the upper end and the electrostatic capacitance value of the detecting portion D2 at the lower end. Since each of the first detection electrodes Xa to Xe has the plurality of resistors R, the electrostatic capacitance value detected at the detecting portion D1 at the upper end of each of the first detection electrodes Xa to Xe and the electrostatic capacitance value detected at the detecting portion D2 at the lower end thereof differ from each other, depending on a proximity position of the operating body.

Also, with respect to each of the second detection electrodes Ya to Yd, the detecting circuit 120 detects the electrostatic capacitance value of the detecting portion D3 at the left end and the electrostatic capacitance value of the detecting portion D4 at the right end. Since each of the second detection electrodes Ya to Yd has the plurality of resistors R, the electrostatic capacitance value detected at the detecting portion D3 at the left end of each of the second detection electrodes Ya to Yd and the electrostatic capacitance value detected at the detecting portion D4 at the right end thereof differ from each other, depending on the proximity position of the operating body.

Based on the electrostatic capacitance values detected by the detecting circuit 120, the computing device 140 determines image data indicating the proximity state of the operating body relative to the operation surface 10A of the input device 10. The computing device 140 is realized by, for example, an integrated circuit (IC).

In this case, the computing device 140 in the present embodiment can determine electrostatic capacitance values (hereinafter referred to as "electrostatic capacitance determination values") of the respective connection portions C provided at the first detection electrodes Xa to Xe and electrostatic capacitance determination values of the respective connection portions C provided at the second detection electrodes Ya to Yd. In addition, the computing device 140 in the present embodiment can determine the image data indicating the proximity state of the operating body, based on the electrostatic capacitance determination values of the respective connection portions C provided at the first detection electrodes Xa to Xe and the electrostatic capacitance determination values of the respective connection portions C provided at the second detection electrodes Ya to Yd.

(Functional Configuration of Computing Device 140)

Figure 4:
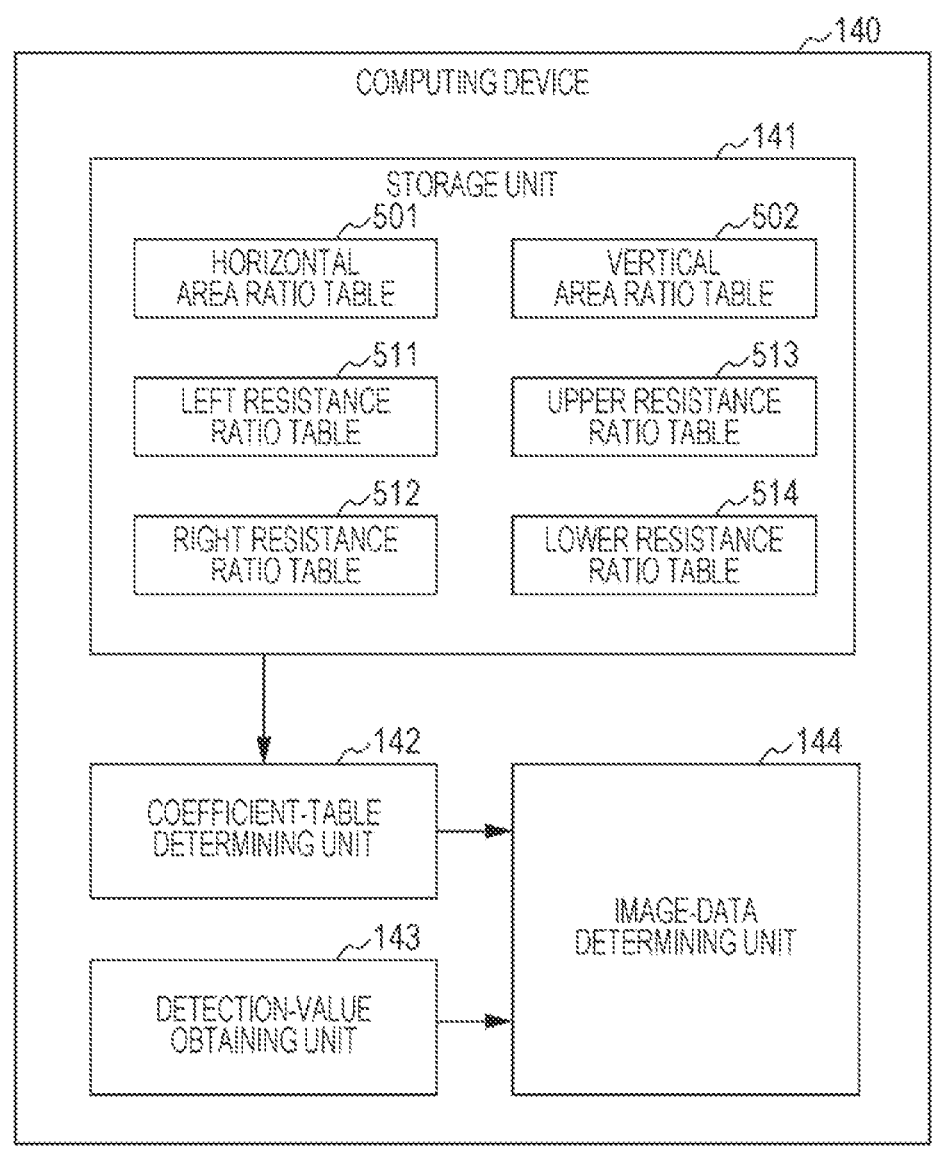
FIG. 4 is a block diagram illustrating a functional configuration of a computing device according to one embodiment.

FIG. 4 is a block diagram illustrating a functional configuration of the computing device 140 according to one embodiment. As illustrated in FIG. 4, the computing device 140 includes a storage unit 141, a coefficient-table determining unit 142, a detection-value obtaining unit 143, and an image-data determining unit 144.

The storage unit 141 stores therein various tables used to determine image data of the operating body, based on the electrostatic capacitance determination values. For example, the storage unit 141 stores therein a horizontal area ratio table 501, a vertical area ratio table 502, a left resistance ratio table 511, a right resistance ratio table 512, an upper resistance ratio table 513, and a lower resistance ratio table 514.

The coefficient-table determining unit 142 determines coefficient tables, based on the various tables stored in the storage unit 141. For example, the coefficient-table determining unit 142 determines a left coefficient table 521, based on the horizontal area ratio table 501 stored in the storage unit 141 and the left resistance ratio table 511 stored in the storage unit 141.

Also, for example, the coefficient-table determining unit 142 determines a right coefficient table 522, based on the horizontal area ratio table 501 stored in the storage unit 141 and the right resistance ratio table 512 stored in the storage unit 141.

Also, for example, the coefficient-table determining unit 142 determines an upper coefficient table 523, based on the vertical area ratio table 502 stored in the storage unit 141 and the upper resistance ratio table 513 stored in the storage unit 141.

Also, for example, the coefficient-table determining unit 142 determines a lower coefficient table 524, based on the vertical area ratio table 502 stored in the storage unit 141 and the lower resistance ratio table 514 stored in the storage unit 141.

The detection-value obtaining unit 143 obtains the electrostatic capacitance detection values of the first detection electrodes Xa to Xe and the second detection electrodes Ya to Yd from the detecting circuit 120. In this case, with respect to each of the first detection electrodes Xa to Xe, the detection-value obtaining unit 143 obtains the electrostatic capacitance detection value detected at the detecting portion D1 (one example of a "first detecting portion") at the upper end side (one example of "one end side of the first detection electrode") and the electrostatic capacitance detection value detected at the detecting portion D2 (one example of a "second detecting portion") at the lower end side (one example of "another end side of the first detection electrode"). Also, with respect to each of the second detection electrodes Ya to Yd, the detection-value obtaining unit 143 obtains the electrostatic capacitance detection value detected at the detecting portion D3 (one example of a "third detecting portion") at the left end side (one example of "one end side of the second detection electrode") and the electrostatic capacitance detection value detected at the detecting portion D4 (one example of a "fourth detecting portion") at the right end side (one example of "another end side of the second detection electrode").

An image-data determining unit 144 determines image data including the electrostatic capacitance determination values of the respective intersections M, based on the electrostatic capacitance detection values obtained by the detection-value obtaining unit 143 and the coefficient tables 521 to 524 determined by the coefficient-table determining unit 142. This image data indicates the proximity state of the operating body relative to the operation surface 10A of the input device 10. The image data determined by the image-data determining unit 144 is, for example, output to a subsequent application, and the application utilizes the image data to execute processing corresponding to the proximity state of the operating body. A specific method for determining the image data, the determination being made by the image-data determining unit 144, is described later with reference to a flowchart in FIG. 5.

For example, in the computing device 140 (one example of a "computer"), a processor executes a program stored in a memory to thereby realize individual functions of the computing device 140 illustrated in FIG. 4.

(Procedure of Processing by Computing Device 140)

Figure 5:
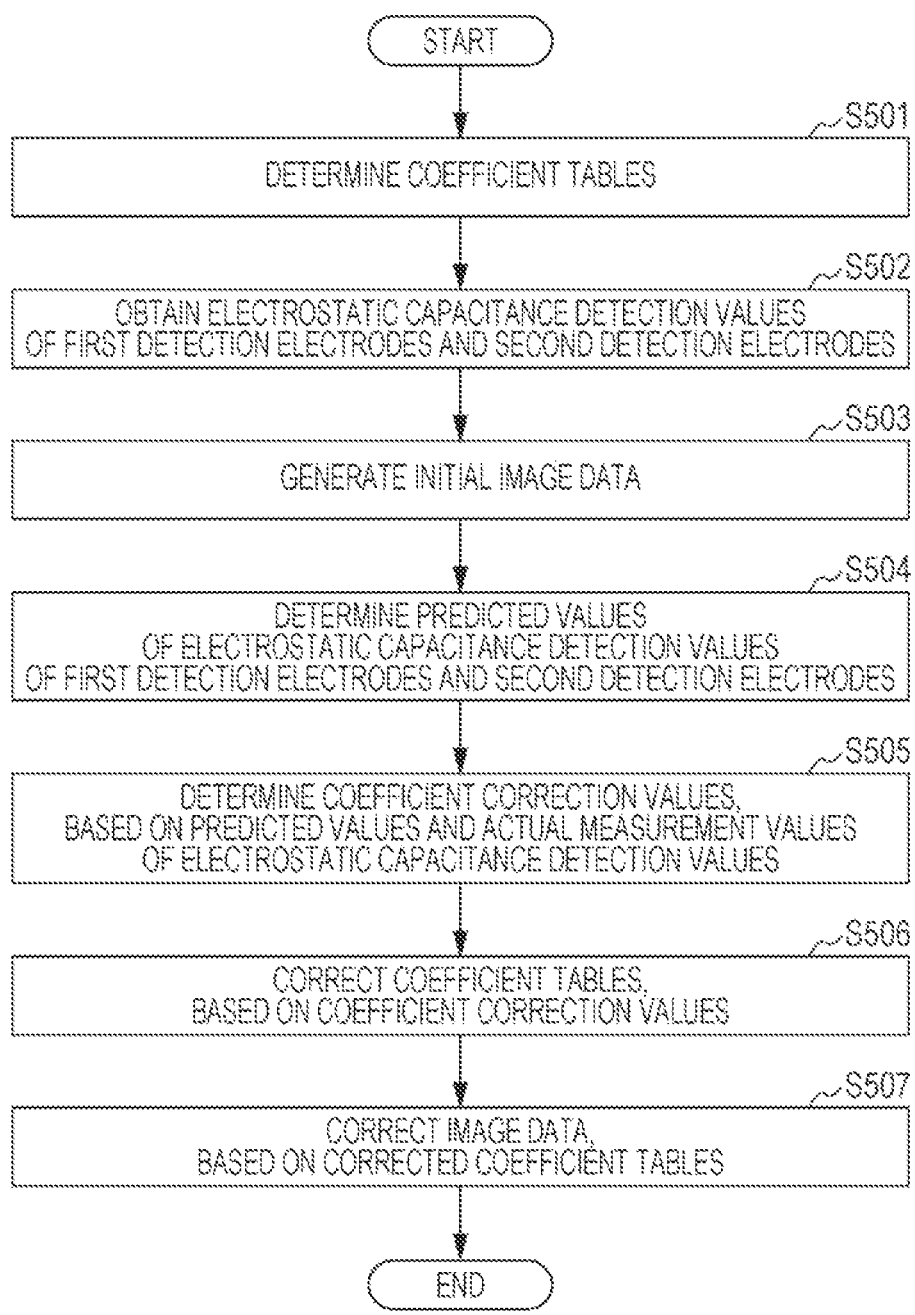
FIG. 5 is a flowchart illustrating a procedure of processing performed by the computing device according to one embodiment.

FIG. 5 is a flowchart illustrating a procedure of processing performed by the computing device 140 according to one embodiment.

The coefficient-table determining unit 142 determines the coefficient tables 521 to 524, based on the horizontal area ratio table 501, the vertical area ratio table 502, the left resistance ratio table 511, the right resistance ratio table 512, the upper resistance ratio table 513, and the lower resistance ratio table 514 stored in the storage unit 141 (step S501).

Next, the detection-value obtaining unit 143 obtains the electrostatic capacitance detection values of the first detection electrodes Xa to Xe and the second detection electrodes Ya to Yd from the detecting circuit 120 (step S502). Specifically, the detection-value obtaining unit 143 obtains the electrostatic capacitance detection values of the respective first detection electrodes Xa to Xe, the electrostatic capacitance detection values being detected at the detecting portions D1 at the upper side, and the electrostatic capacitance detection values of the respective first detection electrodes Xa to Xe, the electrostatic capacitance detection values being detected at the detecting portion D2 at the lower side. Also, the detection-value obtaining unit 143 obtains the electrostatic capacitance detection values of the respective second detection electrodes Ya to Yd, the electrostatic capacitance detection values being detected at the detecting portions D3 at the left side, and the electrostatic capacitance detection values of the respective second detection electrodes Ya to Yd, the electrostatic capacitance detection values being detected at the detecting portion D4 at the right side.

Next, the image-data determining unit 144 generates initial image data (step S503). The initial image data is image data in which predetermined electrostatic capacitance values are set for the respective intersections M of the first detection electrodes Xa to Xe and the second detection electrodes Ya to Yd. For example, the image-data determining unit 144 generates image data in which arbitrary positive electrostatic capacitance values (e.g., "1") other than 0 are set for the respective intersections M.

Next, based on the coefficient tables 521 to 524 determined in step S501 and the initial image data generated in step S503, the image-data determining unit 144 determines predicted values of the electrostatic capacitance detection values for the first detection electrodes Xa to Xe and the second detection electrodes Ya to Yd (step S504).

Specifically, with respect to each of the second detection electrodes Ya to Yd, the image-data determining unit 144 determines first determination values by multiplying the electrostatic capacitance values set in the initial image data by the coefficients set in the left coefficient table 521 for the respective connection portions C located at the respective intersections M. Then, with respect to each of the second detection electrodes Ya to Yd, the image-data determining unit 144 totals the determined first determination values to thereby determine a predicted value of the electrostatic capacitance detection value detected at the detecting portions D3 at the left side.

Also, with respect to each of the second detection electrodes Ya to Yd, the image-data determining unit 144 determines second determination values by multiplying the values set in the image data by the coefficients set in the right coefficient table 522 for the respective connection portion C. Then, with respect to each of the second detection electrodes Ya to Yd, the image-data determining unit 144 totals the determined second determination values to thereby determine a predicted value of the electrostatic capacitance detection value detected at the detecting portion D4 at the right side.

Also, with respect to each of the first detection electrodes Xa to Xe, the image-data determining unit 144 determines third determination values by multiplying the values set in the image data by the coefficients set in the upper coefficient table 523 for the respective connection portions C. Then, with respect to each of the first detection electrodes Xa to Xe, the image-data determining unit 144 totals the determined third determination values to thereby determine a predicted value of the electrostatic capacitance detection value detected at the detecting portion D1 at the upper side.

Also, with respect to each of the first detection electrodes Xa to Xe, the image-data determining unit 144 determines fourth determination values by multiplying the values set in the image data by the coefficients set in the lower coefficient table 524 for the respective connection portions C. Then, with respect to each of the first detection electrodes Xa to Xe, the image-data determining unit 144 totals the determined fourth determination values to thereby determine a predicted value of the electrostatic capacitance detection value detected at the detecting portion D2 at the lower side.

Next, with respect to each of the first detection electrodes Xa to Xe and the second detection electrodes Ya to Yd, the image-data determining unit 144 determines coefficient correction values, based on the actual measurement values of the electrostatic capacitance detection values obtained in step S502 and the predicted values of the electrostatic capacitance detection values determined in step S504 (step S505).

Specifically, with respect to each of the second detection electrodes Ya to Yd, the image-data determining unit 144 divides the electrostatic capacitance detection value of the detecting portion D3 at the left side, the electrostatic capacitance detection value being obtained in step S502, by the predicted value of the detecting portion D3, the predicted value being determined in step S504, to thereby determine a correction value (hereinafter referred to as a "first coefficient correction value") of the electrostatic capacitance detection values detected at the detecting portion D3.

Also, with respect to each of the second detection electrodes Ya to Yd, the image-data determining unit 144 divides the electrostatic capacitance detection value of the detecting portion D4 at the right side, the electrostatic capacitance detection value being obtained in step S502, by the predicted value of the detecting portion D4, the predicted value being determined in step S504, to thereby determine a correction value (hereinafter referred to as a "second coefficient correction value") of the electrostatic capacitance detection value detected at the detecting portion D4.

Also, with respect to each of the first detection electrodes Xa to Xe, the image-data determining unit 144 divides the electrostatic capacitance detection value of the detecting portion D1 at the upper side, the electrostatic capacitance detection value being obtained in step S502, by the predicted value of the detecting portion D1, the predicted value being determined in step S504, to thereby determine a correction value (hereinafter referred to as a "third coefficient correction value") of the electrostatic capacitance detection value detected at the detecting portion D1.

Also, with respect to each of the first detection electrodes Xa to Xe, the image-data determining unit 144 divides the electrostatic capacitance detection value of the detecting portion D2 at the lower side, the electrostatic capacitance detection value being obtained in step S502, by the predicted value of the detecting portion D2, the predicted value being determined in step S504, to thereby determine a correction value (hereinafter referred to as a "fourth coefficient correction value") of the electrostatic capacitance detection value detected at the detecting portion D2.

Next, based on the coefficient correction values determined in step S505, the image-data determining unit 144 corrects the coefficient tables 521 to 524 (step S506).

Specifically, the image-data determining unit 144 corrects the coefficients set in the left coefficient table 521 by multiplying the coefficients set in the left coefficient table 521 by the first coefficient correction values determined in step S505.

Also, the image-data determining unit 144 corrects the coefficients set in the right coefficient table 522 by multiplying the coefficients set in the right coefficient table 522 by the second coefficient correction values determined in step S505.

Also, the image-data determining unit 144 corrects the coefficients set in the upper coefficient table 523 by multiplying the coefficients set in the upper coefficient table 523 by the third coefficient correction values determined in step S505.

Also, the image-data determining unit 144 corrects the coefficients set in the lower coefficient table 524 by multiplying the coefficients set in the lower coefficient table 524 by the fourth coefficient correction values determined in step S505.

Next, based on the coefficient tables 521 to 524 corrected in step S506, the image-data determining unit 144 corrects the image data generated in step S503, to thereby determine corrected image data including the electrostatic capacitance determination values of the respective intersections M (step S507).

Specifically, the image-data determining unit 144 determines first values in the corrected image data by multiplying the values set in the image data generated in step S503 by the corrected coefficients set in the left coefficient table 521 for the respective connection portions C.

Also, the image-data determining unit 144 determines second values in the corrected image data by multiplying the values set in the image data generated in step S503 by the corrected coefficients set in the right coefficient table 522 for the respective connection portions C.

Also, the image-data determining unit 144 determines third values in the corrected image data by multiplying the values set in the image data generated in step S503 by the corrected coefficients set in the upper coefficient table 523 for the respective connection portions C.

Also, the image-data determining unit 144 determines fourth values in the corrected image data by multiplying the values set in the image data generated in step S503 by the corrected coefficients set in the lower coefficient table 524 for the respective connection portions C.

Then, the image-data determining unit 144 totals, for each intersection M, the four values (the first to fourth values) determined for two detection electrodes that intersect at the intersection M, to thereby determine values in the corrected image data including the electrostatic capacitance determination value of the intersection M.

After step S507, the computing device 140 ends the series of processes illustrated in FIG. 5. The computing device 140 may repeatedly execute steps S504 to S507 by using the corrected image data, obtained in step S507, as initial image data, until a predetermined end condition is satisfied (e.g., the corrected image data obtained in step S507 performed a certain number of times satisfies a desired quality (i.e., the amount of correction in step S507 becomes smaller than or equal to a certain amount)). This allows the computing device 140 to gradually bring the electrostatic capacitance determination values of the connection portions C in the image data to optimum solutions.

(Example of Determination of Left Coefficient Table 521)

FIG. 6 illustrates an example of determination of the left coefficient table 521, the determination being made by the coefficient-table determining unit 142 according to one embodiment. As illustrated in FIG. 6, with respect to each of the second detection electrodes Ya to Yd, the area ratios for five connection portions $C_1$ to $C_5$ that are disposed from the detecting portion D3 toward the detecting portion D4 are set in the horizontal area ratio table 501. In the present embodiment, since the areas of the detection faces F in each of the second detection electrodes Ya to Yd are the same, the same area ratio is set for the five connection portions $C_1$ to $C_5$ in the horizontal area ratio table 501 illustrated in FIG. 6.

Also, as illustrated in FIG. 6, the resistance ratios for the five connection portions $C_1$ to $C_5$ with respect to each of the second detection electrodes Ya to Yd are set in the left resistance ratio table 511. Since the left resistance ratio table 511 indicates, with respect to each of the respective five connection portions $C_1$ to $C_5$, a degree of influence on the electrostatic capacitance value detected at the detecting portion D3 provided at the left end portion of each of the second detection electrodes Ya to Yd, a higher resistance ratio is set for the connection portion C that is closer to the detecting portion D3. For example, the resistance ratio for the connection portion $C_1$ that is the closest to the detecting portion D3 is "1", and the resistance ratio for the connection portion $C_5$ that is the farthest from the detecting portion D3 is "0".

However, for the connection portion C at which the resistor is provided, the same resistance ratio as that for the next connection portion C that is more adjacent to (i.e., at the left side of) the detecting portion D3 and at which the resistor is not provided is set. This is because these two adjacent connection portions C are the same in resistance value, when viewed from the detecting portion D1. For example, in the left resistance ratio table 511 illustrated in FIG. 6, with respect to the second detection electrode Ya, for the connection portion $C_2$ at which the resistor is provided, the same resistance ratio ("1") as that for the next connection portion $C_1$ that is more adjacent to the detecting portion D3 and at which the resistor is not provided is set.

The coefficient-table determining unit 142 determines the left coefficient table 521, based on the horizontal area ratio table 501 and the left resistance ratio table 511. Specifically, with respect to the connection portions C of each of the second detection electrodes Ya to Yd, the coefficient-table determining unit 142 determines coefficients by multiplying the area ratios set in the horizontal area ratio table 501 by the resistance ratios set in the left resistance ratio table 511. Thus, as illustrated in FIG. 6, the coefficient-table determining unit 142 determines the left coefficient table 521 in which the coefficients for the respective connection portions C are set with respect to each of the second detection electrodes Ya to Yd.

(Example of Determination of Right Coefficient Table 522)

FIG. 7 illustrates an example of determination of the right coefficient table 522, the determination being made by the coefficient-table determining unit 142 according to one embodiment. As illustrated in FIG. 7, with respect to each of the second detection electrodes Ya to Yd, the area ratios for the respective five connection portions $C_1$ to $C_5$ that are disposed from the detecting portion D3 to the detecting portion D4 are set in the horizontal area ratio table 501. In the present embodiment, since the areas of the detection faces F in each of the second detection electrodes Ya to Yd are the same, the same area ratio is set for the five connection portions $C_1$ to $C_5$ in the horizontal area ratio table 501 illustrated in FIG. 7.

Also, as illustrated in FIG. 7, the resistance ratios for the respective five connection portions $C_1$ to $C_5$ with respect to each of the second detection electrodes Ya to Yd are set in the right resistance ratio table 512. Since the right resistance ratio table 512 indicates, with respect to each of the five connection portions $C_1$ to $C_5$, a degree of influence on the electrostatic capacitance value detected at the detecting portion D4 provided at the right end portion of each of the second detection electrodes Ya to Yd, a higher resistance ratio is set for the connection portion C that is closer to the detecting portion D4. For example, the resistance ratio for the connection portion $C_5$ that is the closest to the detecting portion D4 is "1", and the resistance ratio for the connection portion $C_1$ that is the farthest from the detecting portion D4 is "0".

However, for the connection portion C at which the resistor is provided, the same resistance ratio as that for the next connection portion C that is more adjacent to (i.e., at the right side of) the detecting portion D4 and at which the resistor is not provided is set. This is because these two adjacent connection portions C are the same in resistance value, when viewed from the detecting portion D4. For example, in the right resistance ratio table 512 illustrated in FIG. 7, with respect to the second detection electrode Ya, for the connection portion $C_4$ at which the resistor is provided, the same resistance ratio ("1") as that for the next connection portion $C_5$ that is more adjacent to the detecting portion D4 and at which the resistor is not provided is set.

The coefficient-table determining unit 142 determines the right coefficient table 522, based on the horizontal area ratio table 501 and the right resistance ratio table 512. Specifically, with respect to the connection portions C of each of the second detection electrodes Ya to Yd, the coefficient-table determining unit 142 determines coefficients by multiplying the area ratios set in the horizontal area ratio table 501 by the resistance ratios set in the right resistance ratio table 512. Thus, as illustrated in FIG. 7, the coefficient-table determining unit 142 determines the right coefficient table 522 in which the coefficients for the respective connection portions C are set with respect to each of the second detection electrodes Ya to Yd.

(Example of Determination of Upper Coefficient Table 523)

FIG. 8 illustrates an example of determination of the upper coefficient table 523, the determination being made by the coefficient-table determining unit 142 according to one embodiment. As illustrated in FIG. 8, with respect to each of the first detection electrodes Xa to Xe, the area ratios for the four connection portions $C_1$ to $C_4$ that are disposed from the detecting portion D1 toward the detecting portion D2 are set in the vertical area ratio table 502. In the present embodiment, since the areas of the detection faces F in each of the first detection electrodes Xa to Xe are the same, the same area ratio is set for the four connection portions $C_1$ to $C_4$ in the vertical area ratio table 502 illustrated in FIG. 8.

Also, as illustrated in FIG. 8, with respect to each of the first detection electrodes Xa to Xe, resistance ratios for the respective four connection portions $C_1$ to $C_4$ are set in the upper resistance ratio table 513. Since the upper resistance ratio table 513 indicates, with respect to each of the four connection portions $C_1$ to $C_4$, a degree of influence on the electrostatic capacitance value detected at the detecting portion D1 provided at the upper end portion of each of the first detection electrodes Xa to Xe, a higher resistance ratio is set for the connection portion C that is closer to the detecting portion D1. For example, in each of the first detection electrodes Xa, Xc, and Xe, the resistance ratio for the connection portion $C_1$ that is the closest to the detecting portion D1 is "1", and the resistance ratio of the connection portion $C_4$ that is the farthest from the detecting portion D1 is "0". Also, in each of the first detection electrode Xb and Xd, the resistance ratio for the connection portion $C_1$ that is the closest to the detecting portion D1 is "0.75", and the resistance ratio for the connection portion $C_4$ that is the farthest from the detecting portion D1 is "0.25".

However, for the connection portion C at which the resistor is provided, the same resistance ratio as that for the next connection portion C that is more adjacent to (i.e., at the upper side of) the detecting portion D1 and at which the resistor is not provided is set. This is, these two adjacent connection portions C are the same in resistance value, when viewed from the detecting portion D1. For example, in the upper resistance ratio table 513 illustrated in FIG. 8, with respect to each of the first detection electrodes Xb and Xd, for the connection portion $C_2$ at which the resistor is provided, the same resistance ratio ("0.75") as that for the next connection portion $C_1$ that is more adjacent to the detecting portion D1 and at which the resistor is not provided is set.

The coefficient-table determining unit 142 determines the upper coefficient table 523, based on the vertical area ratio table 502 and the upper resistance ratio table 513. Specifically, with respect to the connection portions C of each of the first detection electrodes Xa to Xe, the coefficient-table determining unit 142 determines coefficients by multiplying the area ratios set in the vertical area ratio table 502 by the resistance ratios set in the upper resistance ratio table 513. Thus, as illustrated in FIG. 8, the coefficient-table determining unit 142 determines the upper coefficient table 523 in which the coefficients for the respective connection portions C are set with respect to each of the first detection electrodes Xa to Xe.

(Example of Determination of Lower Coefficient Table 524)

FIG. 9 illustrates an example of determination of the lower coefficient table 524, the determination being made by the coefficient-table determining unit 142 according to one embodiment. As illustrated in FIG. 9, with respect to each of the first detection electrodes Xa to Xe, the area ratios for the respective four connection portions $C_1$ to $C_4$ that are disposed from the detecting portion D1 toward the detecting portion D2 are set in the vertical area ratio table 502. In the present embodiment, since the areas of the detection faces F in each of the first detection electrodes Xa to Xe are the same, the same area ratio is set for the four connection portions $C_1$ to $C_4$ in the vertical area ratio table 502 illustrated in FIG. 9.

Also, as illustrated in FIG. 9, the resistance ratios for the respective four connection portions $C_1$ to $C_4$ with respect to each of the first detection electrodes Xa to Xe are set in the lower resistance ratio table 514. Since the lower resistance ratio table 514 indicates, with respect to each of the four connection portions $C_1$ to $C_4$, a degree of influence on the electrostatic capacitance value detected at the detecting portion D2 provided at the lower end portion of each of the first detection electrodes Xa to Xe, a higher resistance ratio is set for the connection portion C that is closer to the detecting portion D2. For example, in each of the first detection electrodes Xb and Xd, the resistance ratio for the connection portion $C_4$ that is the closest to the detecting portion D2 is "1", and the resistance ratio for the connection portion $C_1$ that is the farthest from the detecting portion D2 is "0". Also, in each of the first detection electrodes Xa, Xc, and Xe, the resistance ratio for the connection portion $C_4$ that is the closest to the detecting portion D2 is "0.75", and the resistance ratio for the connection portion $C_1$ that is the farthest from the detecting portion D2 is "0.25".

However, for the connection portion C at which the resistor is provided, the same resistance ratio as that for the next connection portion C that is more adjacent to (i.e., at the lower side of) the detecting portion D2 and at which the resistor is not provided is set. These two adjacent connection portions C are the same in resistance value, when viewed from the detecting portion D2. For example, in the lower resistance ratio table 514 illustrated in FIG. 9, with respect to each of the first detection electrodes Xa, Xc, and Xe, for the connection portion $C_3$ at which the resistor is provided, the same resistance ratio ("0.75") as that for the next connection portion $C_4$ that is more adjacent to the detecting portion D2 and at which the resistor is not provided is set.

The coefficient-table determining unit 142 determines the lower coefficient table 524, based on the vertical area ratio table 502 and the lower resistance ratio table 514. Specifically, with respect to the connection portions C of each of the first detection electrodes Xa to Xe, the coefficient-table determining unit 142 determines coefficients by multiplying the area ratios set in the vertical area ratio table 502 by the resistance ratios set in the lower resistance ratio table 514. Thus, as illustrated in FIG. 9, the coefficient-table determining unit 142 determines the lower coefficient table 524 in which the coefficients for the respective connection portions C are set with respect to each of the first detection electrodes Xa to Xe.

As described above, an electrostatic capacitance sensor 100 according to the present embodiment is an electrostatic capacitance sensor 100 that includes first detection electrodes Xa to Xe and second detection electrodes Ya to Yd that are disposed orthogonal to each other. Each of the first detection electrodes Xa to Xe and the second detection electrodes Ya to Yd has detection faces F that are linearly arranged and connection portions C that connect the adjacent detection faces F. The electrostatic capacitance sensor has intersections M of the first detection electrodes Xa to Xe and the second detection electrodes Ya to Yd, the intersections being arranged in a matrix. The intersections M where resistors R are provided at the connection portions C of the first detection electrodes Xa to Xe and the intersections M where resistors R are provided at the connection portions C of the second detection electrodes Ya to Yd are alternately arranged.

Thus, since the electrostatic capacitance sensor 100 according to the present embodiment does not have intersections M where the resistors R provided at the first detection electrodes Xa to Xe and the resistors R provided at the second detection electrodes Ya to Yd overlap each other, it is possible to reduce the spacing distance between the first detection electrodes Xa to Xe and the second detection electrodes Ya to Yd. Therefore, according to the present embodiment, it is possible to reduce the thickness of the entire electrostatic capacitance sensor 100.

Also, in the electrostatic capacitance sensor 100 according to the present embodiment, compared with a case in which resistors are provided at the respective connection portions of the vertical electrodes and the respective connection portions of the horizontal electrodes at the intersections where the vertical electrodes and the horizontal electrodes intersect each other, it is possible to reduce the cost by reducing the amount of material used for forming the resistors, and it is also possible to reduce the number of fabrication processes.

Also, in the electrostatic capacitance sensor 100 according to the present embodiment, the connection portions C at which the resistors R are provided and the connection portions C at which the resistors R are not provided are alternately provided at the first detection electrodes Xa to Xe and the second detection electrodes Ya to Yd; the connection portions C at which the resistors R are not provided at the first detection electrodes Xa to Xe and the connection portions C at which the resistors R are provided at the second detection electrodes Ya to Yd intersect each other; and the connection portions C at which the resistors R are provided at the first detection electrodes Xa to Xe and the connection portions C at which the resistors R are not provided at the second detection electrodes Ya to Yd intersect each other.

Thus, by disposing the first detection electrodes Xa to Xe and the second detection electrodes Ya to Yd to be orthogonal each other, it is possible to provide a configuration in which the electrostatic capacitance sensor 100 according to the present embodiment does not have intersections M where the resistors R provided at the first detection electrodes Xa to Xe and the resistors R provided at the second detection electrodes Ya to Yd overlap each other. Therefore, according to the present embodiment, it is possible to easily reduce the thickness of the entire electrostatic capacitance sensor 100.

Also, in the electrostatic capacitance sensor 100 according to the present embodiment, the first detection electrodes Xa to Xe and the second detection electrodes Ya to Yd are provided in the same plane.

Thus, according to the present embodiment, it is possible to further reduce the thickness of the entire electrostatic capacitance sensor 100.

Also, an input device 10 according to the present embodiment is an input device 10 including: the electrostatic capacitance sensor 100; and a computing device 140 that determines image data indicating a proximity state of an operating body relative to an operation surface 10A, based on electrostatic capacitance detection values of the first detection electrodes Xa to Xe and the second detection electrodes Ya to Yd, the electrostatic capacitance detection values being detected at detecting portions D1 to D4 in the electrostatic capacitance sensor 100. The computing device 140 includes: a detection-value obtaining unit 143 that obtains the electrostatic capacitance detection values of the respective first detection electrodes Xa to Xe and second detection electrodes Ya to Yd; and an image-data determining unit 144 that determines the image data including electrostatic capacitance determination values of the respective intersections M, based on the electrostatic capacitance detection values obtained by the detection-value obtaining unit 143 and resistance ratios corresponding to positions of the respective connection portions C, the resistance ratios being pre-set for the respective first detection electrodes Xa to Xe and second detection electrodes Ya to Yd. The image-data determining unit 144 uses the same resistance ratio for the two connection portions C that are adjacent to each other and that are same in resistance values from the detecting portions D1 to D4.

Thus, in the input device 10 according to the present embodiment, since the resistors R are alternately arranged at the detection electrodes, two mutually adjacent connection portions C whose resistance values from the detecting portions D1 to D4 are the same exist. Correspondingly, use of the same resistance ratio for the two connection portions C allows the image data to be determined with higher accuracy.

Although embodiments of the present invention have been detailed above, the present invention is not limited to those embodiments, and various changes and modifications can be made thereto within the spirit of the present invention recited in the claims.

For example, the computing device 140 may be adapted to store the coefficient tables 521 to 524, determined by the coefficient-table determining unit 142, in the storage unit 141. In this case, the computing device 140 may be adapted to read the coefficient tables 521 to 524 from the storage unit 141 in next and subsequent processing.

Also, for example, when all the setting values in the area ratio tables 501 and 502 are the same, the computing device 140 may directly use the resistance ratio tables 511 to 514 as the coefficient tables 521 to 524.

What is claimed is:

1. An electrostatic capacitance sensor comprising:
    first detection electrodes and second detection electrodes that are disposed orthogonal to each other, each of the first detection electrodes and the second detection electrodes having detection faces that are linearly arranged and connection portions that connect the two adjacent detection faces; and
    a computing device that determines image data indicating a proximity state of an operating body relative to an operation surface, based on electrostatic capacitance detection values of the first detection electrodes and the second detection electrodes, the electrostatic capacitance detection values being detected at detecting portions in the electrostatic capacitance sensor, wherein the electrostatic capacitance sensor has intersections of the first detection electrodes and the second detection electrodes, the intersections being arranged in a matrix,
    wherein intersections where resistors are provided at the connection portions of the first detection electrodes and intersections where resistors are provided at the connection portions of the second detection electrodes are alternately arranged,
    wherein the computing device includes:
        a detection-value obtaining unit that obtains the electrostatic capacitance detection values of the respective first detection electrodes and second detection electrodes; and
        an image-data determining unit that determines the image data including electrostatic capacitance determination values of the respective intersections, based on the electrostatic capacitance detection values obtained by the detection-value obtaining unit and resistance ratios corresponding to positions of the respective connection portions, the resistance ratios being pre-set for the respective first detection electrodes and second detection electrodes; and
    wherein the image-data determining unit uses the same resistance ratio for the two connection portions that are adjacent to each other and that are same in resistance values from the detecting portions.

2. The electrostatic capacitance sensor according to claim 1,
    wherein the connection portions at which the resistors are provided and the connection portions at which the resistors are not provided are alternately provided at the first detection electrodes and the second detection electrodes;
    the connection portions at which the resistors are not provided at the first detection electrodes and the connection portions at which the resistors are provided at the second detection electrodes intersect each other; and
    the connection portions at which the resistors are provided at the first detection electrodes and the connection portions at which the resistors are not provided at the second detection electrodes intersect each other.

3. The electrostatic capacitance sensor according to claim 1,
    wherein the first detection electrodes and the second detection electrodes are provided in a same plane.

4. An input device comprising:
    the electrostatic capacitance sensor according to claim 3; and
    a computing device that determines image data indicating a proximity state of an operating body relative to an operation surface, based on electrostatic capacitance detection values of the first detection electrodes and the second detection electrodes, the electrostatic capacitance detection values being detected at detecting portions in the electrostatic capacitance sensor,
    wherein the computing device includes
        a detection-value obtaining unit that obtains the electrostatic capacitance detection values of the respective first detection electrodes and second detection electrodes, and
        an image-data determining unit that determines the image data including electrostatic capacitance determination values of the respective intersections, based on the electrostatic capacitance detection values obtained by the detection-value obtaining unit and resistance ratios corresponding to positions of the respective connection portions, the resistance ratios being pre-set for the respective first detection electrodes and second detection electrodes; and wherein the image-data determining unit uses the same resistance ratio for the two connection portions that are adjacent to each other and that are same in resistance values from the detecting portions.

5. An input device comprising:

the electrostatic capacitance sensor according to claim 2; and a computing device that determines image data indicating a proximity state of an operating body relative to an operation surface, based on electrostatic capacitance detection values of the first detection electrodes and the second detection electrodes, the electrostatic capacitance detection values being detected at detecting portions in the electrostatic capacitance sensor, wherein the computing device includes
a detection-value obtaining unit that obtains the electrostatic capacitance detection values of the respective first detection electrodes and second detection electrodes, and
an image-data determining unit that determines the image data including electrostatic capacitance determination values of the respective intersections, based on the electrostatic capacitance detection values obtained by the detection-value obtaining unit and resistance ratios corresponding to positions of the respective connection portions, the resistance ratios being pre-set for the respective first detection electrodes and second detection electrodes; and wherein the image-data determining unit uses the same resistance ratio for the two connection portions that are adjacent to each other and that are same in resistance values from the detecting portions.

6. The input device according to claim 5,
wherein the first detection electrodes and the second detection electrodes are provided in a same plane.

7. An input device comprising:

the electrostatic capacitance sensor according to claim 6, and a computing device that determines image data indicating a proximity state of an operating body relative to an operation surface, based on electrostatic capacitance detection values of the first detection electrodes and the second detection electrodes, the electrostatic capacitance detection values being detected at detecting portions in the electrostatic capacitance sensor, wherein the computing device includes
a detection-value obtaining unit that obtains the electrostatic capacitance detection values of the respective first detection electrodes and second detection electrodes, and
an image-data determining unit that determines the image data including electrostatic capacitance determination values of the respective intersections, based on the electrostatic capacitance detection values obtained by the detection-value obtaining unit and resistance ratios corresponding to positions of the respective connection portions, the resistance ratios being pre-set for the respective first detection electrodes and second detection electrodes; and wherein the image-data determining unit uses the same resistance ratio for the two connection portions that are adjacent to each other and that are same in resistance values from the detecting portions.

* * * * *